(12) United States Patent
Mikolajewski

(10) Patent No.: US 6,877,766 B2
(45) Date of Patent: Apr. 12, 2005

(54) HOLDER FOR VEHICLE UPHOLSTERY

(75) Inventor: Sergej Mikolajewski, Ludwigsburg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 43 days.

(21) Appl. No.: 10/275,110

(22) PCT Filed: Jan. 19, 2002

(86) PCT No.: PCT/EP02/00488

§ 371 (c)(1),
(2), (4) Date: Jan. 29, 2003

(87) PCT Pub. No.: WO02/068247

PCT Pub. Date: Sep. 6, 2002

(65) Prior Publication Data

US 2004/0037629 A1 Feb. 26, 2004

(30) Foreign Application Priority Data

Feb. 23, 2001 (DE) ......................................... 101 08 685

(51) Int. Cl.$^7$ ............................................. B60R 21/16
(52) U.S. Cl. ................................................. 280/728.2
(58) Field of Search ............................. 280/732, 728.2, 280/728.3, 752

(56) References Cited

U.S. PATENT DOCUMENTS

| | | | | |
|---|---|---|---|---|
| 5,303,951 A | * | 4/1994 | Goestenkors et al. ..... | 280/728.3 |
| 5,887,891 A | * | 3/1999 | Taquchi et al. .......... | 280/728.2 |
| 6,502,851 B2 | * | 1/2003 | Kitagawa ................. | 280/728.2 |

FOREIGN PATENT DOCUMENTS

| | | |
|---|---|---|
| DE | 41 28 114 | 2/1993 |
| DE | 197 14 356 | 4/1998 |
| JP | 06-107104 | 4/1994 |

* cited by examiner

Primary Examiner—Faye M. Fleming
(74) Attorney, Agent, or Firm—Crowell & Moring LLP

(57) ABSTRACT

A support for an interior lining part of a vehicle has a first attachment element connectable to the interior lining part and a second attachment element connectable to the body of the vehicle. An elastically and/or plastically deformable deformation element, which lies between the attachment elements and is connected to the attachment elements, has a tensile load absorption feature which relieves the deformation element in the tension direction. To achieve reproducible deformation results on the support, the tensile load absorption feature includes a hook on at least one of its ends, which is hooked onto one of the attachment elements or onto an end of the deformation element on the attachment element side. The hook is open toward the tension direction.

13 Claims, 5 Drawing Sheets

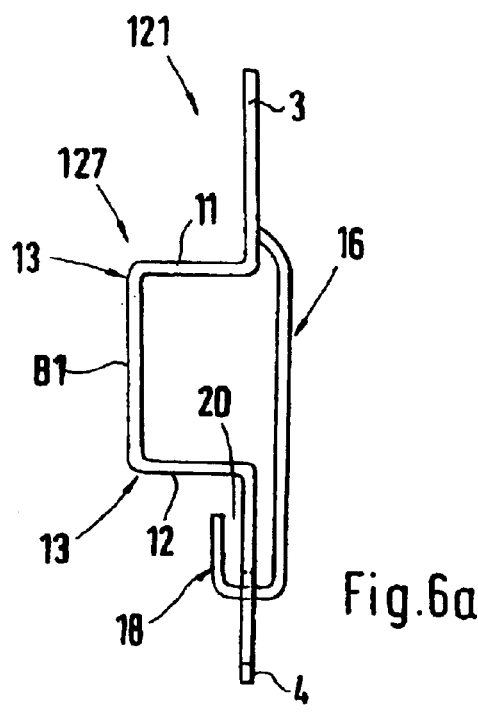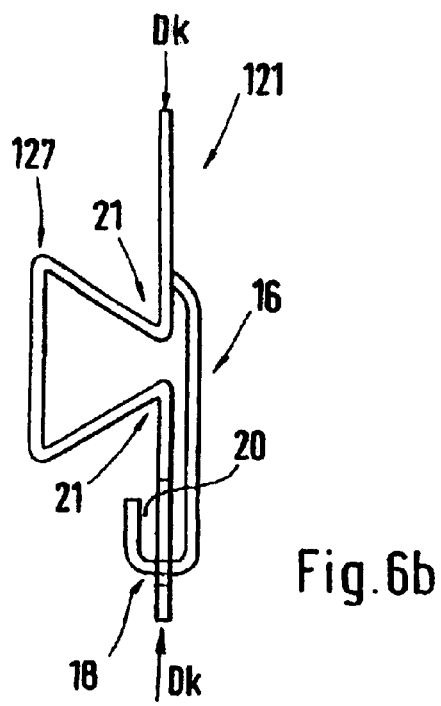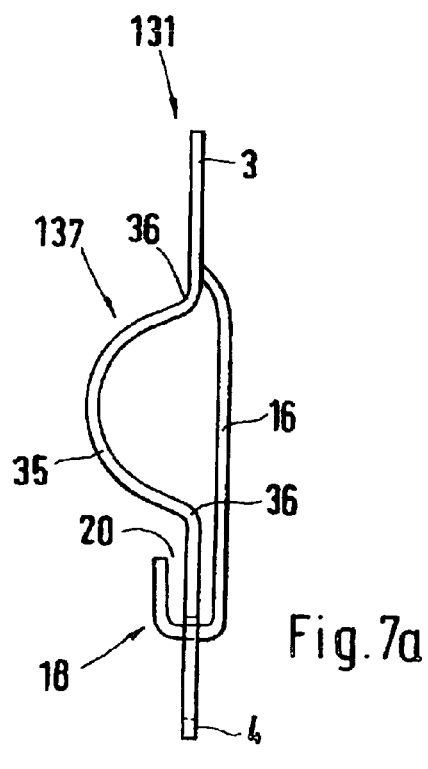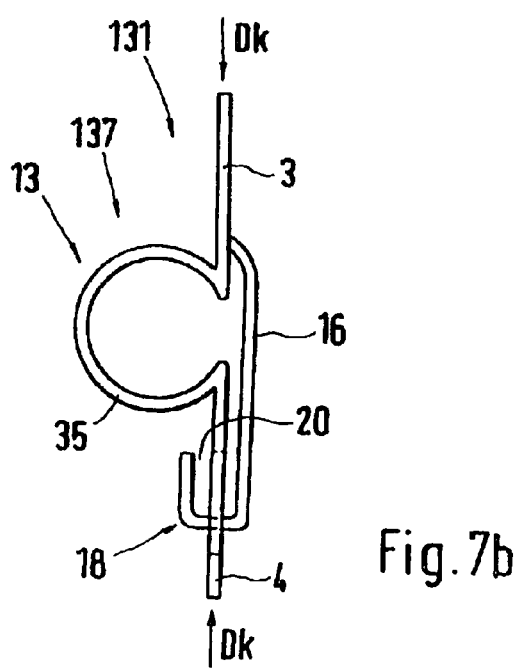

HOLDER FOR VEHICLE UPHOLSTERY

BACKGROUND OF THE INVENTION

This application is a 371 of International Patent Application No. PCT/EP02/00488, filed Jan. 19, 2002, which claims the priority of German Patent Application No. 101 08 685.7, filed Feb. 23, 2001, the disclosures of which are expressly incorporated by reference herein.

The present invention relates to a support for an interior lining part of a vehicle, and more particularly, to a support comprising a first attachment element connectable to the interior lining part, a second attachment element connectable to the body of the vehicle, an elastically and/or plastically deformable deformation element which lies between the attachment elements and is connected to the attachment elements, and having a tensile load absorber which relieves the deformation element in the tension direction.

Japanese Patent 7-81508 describes a support for an interior lining panel part which is positioned in the impact region of the knee joints of occupants. The known support has a first attachment element, to which the interior lining part is attached. A second attachment element of the support is connected to the body, particularly a crossbeam for a dashboard. A deformation element having legs arranged in a V-shape lies between the two attachment elements. A buckling region is implemented in the connection region of both legs of the V, which is deformed in the event of a knee impact in order to transform the impact energy acting as a compressive load essentially into deformation work. In the event of a tensile load, the deformation element is relieved by a tensile load absorption feature, formed by a straight stud in the present support, which is attached to the two legs of the V by welding. It is, however, disadvantageous in the known support that the tensile load absorption means impairs the deformation behavior of the deformation element.

A support which is used for a knee protection device and holds a panel onto the vehicle body is described in DE 195 11 512 A1. However, it does not have any tensile load absorption feature, so that its curved deformation element may be deformed both by tensile and by compressive loads, due to which the panel of the knee protection may project from the other lining parts of the dashboard under unfavorable circumstances, which results in a non-uniform appearance.

SUMMARY OF THE INVENTION

An object of the present invention is to provide a support for an interior lining part, whose deformation element is deformed in a defined way in the event of a compressive load due to an impact and remains essentially undeformed in the event of a tensile load.

This object has been achieved with a support for an interior lining part where the tensile load absorption element has a hook on at least one of its ends, which may be hooked onto one of the attachment elements or onto an end of the deformation element toward one of the attachment elements and may be unhooked toward the tension direction.

Among the main advantages achieved with the support according to the present invention are that it holds the interior lining part onto the vehicle body in such a way that, in the event of an impact of a body part on the interior lining part, softness and/or yielding of the support is provided in order to keep the risk of injury low. In the event of introduction of force against the impact direction, the interior lining part is held on the body of the vehicle rigidly and precisely in position. An introduction of force against the impact direction may, for example, occur as an occupant gets out or as the vehicle is unloaded, if a body part or an object engages behind the lining part.

According to another aspect of the present invention, the support may be produced in a particularly cost-effective and simple way, since only a few working steps are necessary if the support is implemented as a bent and stamped part and assembling the individual support components is not necessary because the support is in one piece.

The support is particularly preferably used for an interior lining part which forms a cover for an airbag module or has this cover. In the event the module is triggered, the airbag impacts on the inner side of this cover and/or of the interior lining part. Because the deformation element is relieved in this force direction by the tensile load absorption feature, and therefore has a high rigidity, the airbag cover may reliably be blown off and/or opened like a flap. If a body part impacts this interior lining part as a consequence of an accident, however, for example if airbag triggering is not provided at a lower speed of the motor vehicle or the airbag is not triggered due to an error, the impact energy may be converted into deformation work on the deformation element. The risk of injury for occupants is reduced at the same time.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein:

FIG. 6a is a side view of a fourth embodiment of a support in accordance with the present invention;

FIG. 6b shows the support depicted in FIG. 6a after a deformation;

FIG. 7a is a side view of a fifth embodiment of a support in accordance with the present invention;

FIG. 7b shows the deformed support shown in FIG. 7a;

DETAILED DESCRIPTION OF THE DRAWINGS

Figure 1:
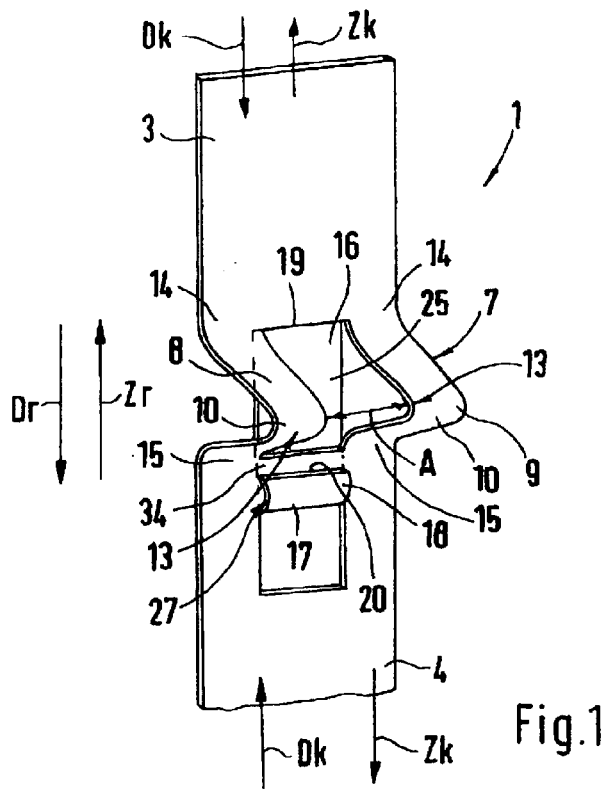
FIG. 1 is a perspective view of a first embodiment of a support for an interior lining part of a motor vehicle according to the present invention.
Figure 2:
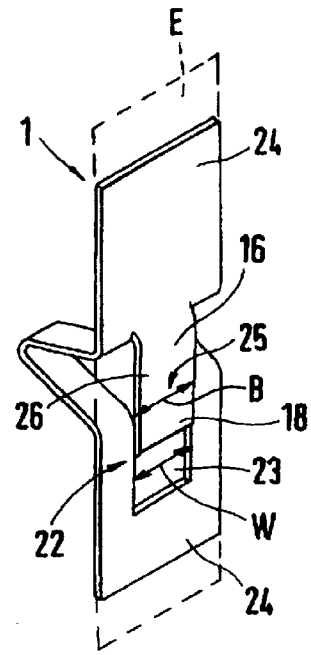
FIG. 2 shows the support depicted in FIG. 1 in a perspective rear view.
Figure 8:
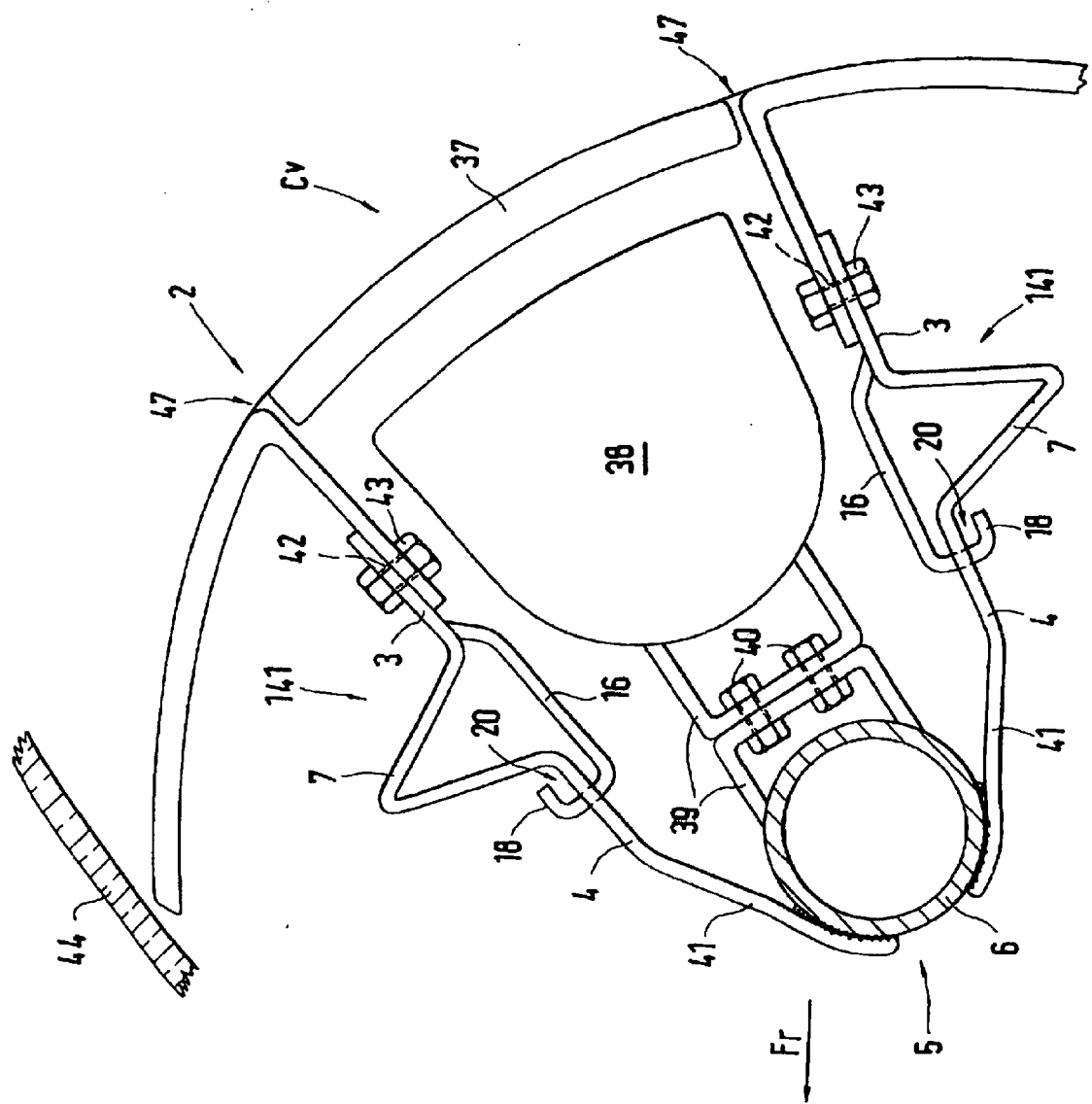
FIG. 8 shows a detail of a dashboard in partial cross-section having a support according to a sixth embodiment.
Figure 9:
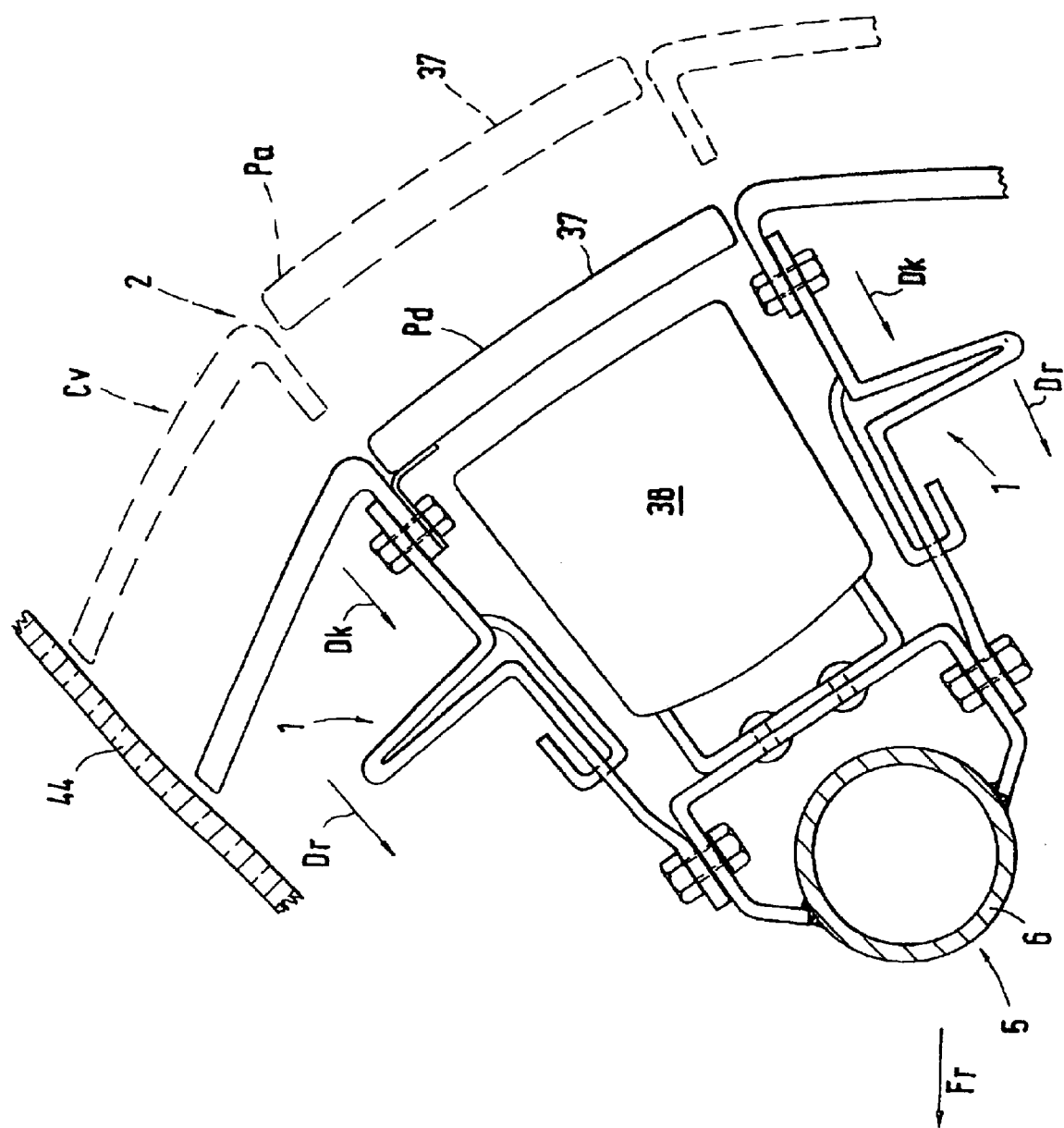
FIG. 9 shows a partially illustrated dashboard depicted in FIG. 8 after an impact of an object on an interior lining part.
Figure 10:
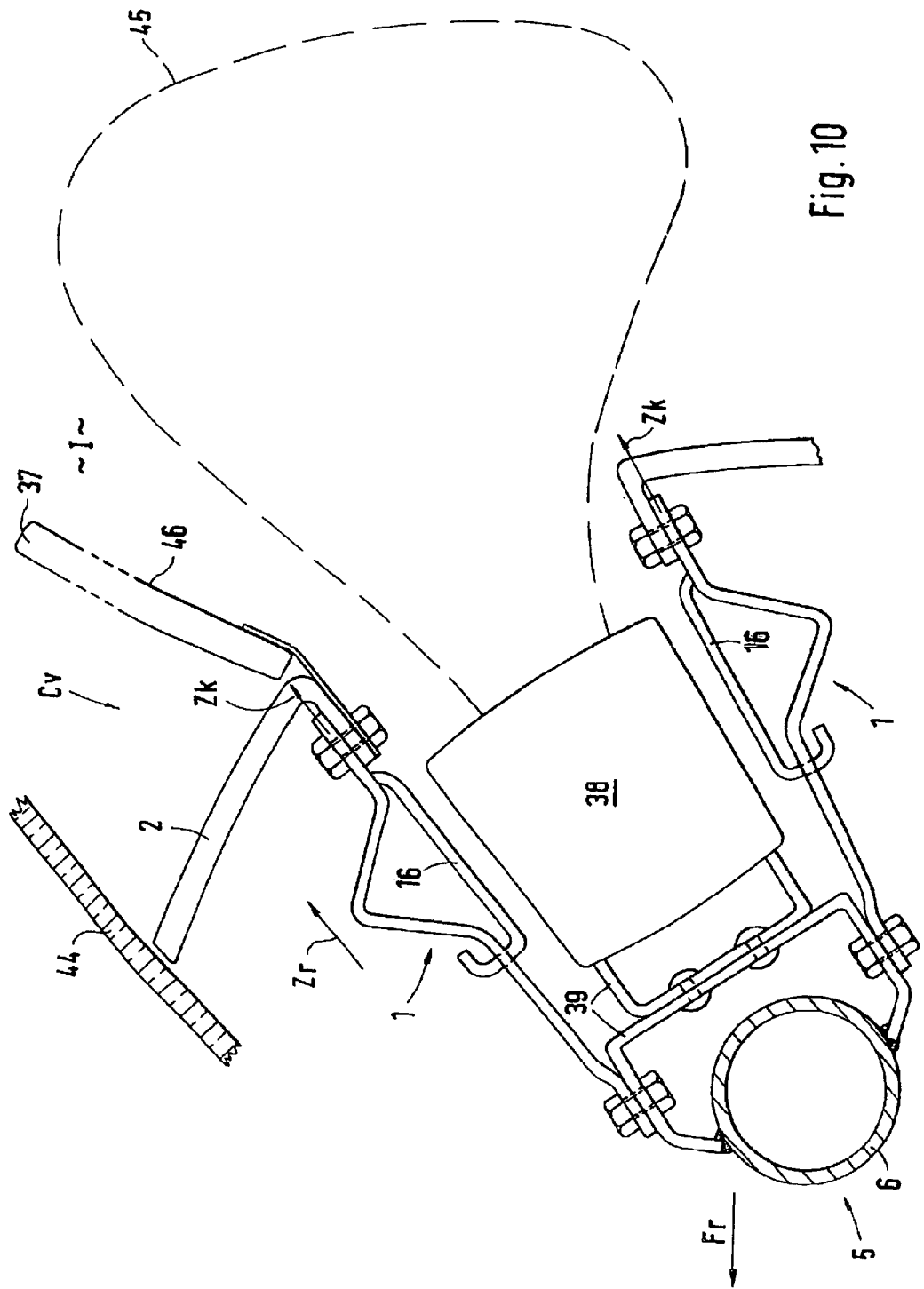
FIG. 10 shows a partially visible dashboard of the type depicted in FIG. 8 after an airbag has been triggered.

A support 1 for an interior lining part 2 shown in FIGS. 8, 9, and 10, for example a motor vehicle dashboard is seen in FIGS. 1 and 2. Support 1 has a first attachment element 3, which is connectable to interior lining part 2. A second attachment element 4 of support 1 may be fixed to a motor vehicle body 5 (FIG. 8), only a crossbeam for the dashboard being illustrated as a cockpit crossbeam 6, which extends transverse to travel direction Fr in the vehicle, particularly between two body components lying laterally opposite one another, and being used as a beam for body components of the dashboard.

An elastically and/or plastically deformable deformation element 7, which may include one or more curved sections 8 and/or 9, is positioned between the two attachment elements 3, 4, which preferably lie essentially in a plane E. Curved sections 8, 9 may lie next to and spaced from one another by a distance A. In the embodiment illustrated in FIG. 1, the course or shape of curved sections 8, 9 is approximately V-shaped. A connection region 10 between legs 11, 12 of the V forms an intended buckling region 13 of deformation element 7. Ends 14, 15 of each curved section 8, 9 are connected to first and/or second attachment element 3 and/or 4.

Figures 3, 4:
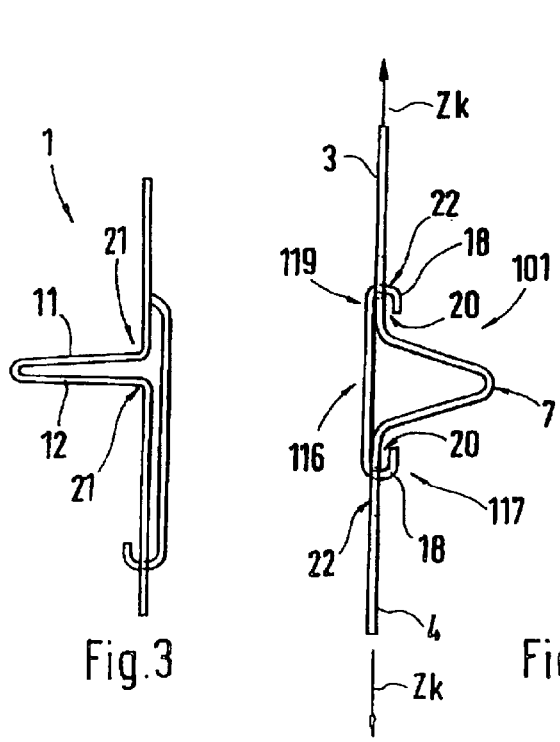
FIG. 3 shows the support depicted in FIG. 1 in a side view after a deformation.
FIG. 4 is a side view of a second embodiment of a support for an interior lining part according to the present invention.

Besides deformation element 7, a tensile load absorption device 16 having a hook 18 on one end 17 so as to be hooked onto attachment element 4 is positioned between both attachment elements 3 and 4. Hook 18 is implemented open toward a tension direction Zr defined as a load direction. However, it may also be closed and, particularly through deformation, be able to be opened and/or bent up, so that, in the event of introduction of force toward tension direction Zr, it is unhooked from the attachment element. The other end 19 of tensile load absorption device 16 is rigidly connected to attachment element 3 and/or implemented in one piece therewith. Tensile load absorption device 16 bypasses the deformation element in the event of a tensile load Zk acting on attachment elements 3, 4 in tension direction Zr, so that the deformation element 7 is not deformed. If a compressive load Dk, corresponding to a pressure direction Dr oriented anti-parallel or counter to tension direction Zr, acts on attachment elements 3, 4, deformation element 7 may be deformed, particularly in intended buckling region 13, because hook 18, implemented with opening 20, then releases second attachment element 4, as seen in FIG. 3. In addition, a deformation occurs in a transition region 21 between ends 14, 15 of curved sections 8 or 9 and corresponding attachment element 3 or 4, respectively, if deformation element 7 is deformed. Hook 18 of tensile load absorption device 16 is unhooked from an eye 22 in the event of a deformation of the deformation element and thus releases the attachment element. Eye 22 can be formed by a cutout 23 that can be introduced into attachment elements 3 and/or 4 which are configured here as slab-shaped strips 24.

Support 1, having its attachment elements 3, 4, its deformation element 7, and tensile load absorption mechanism 16, may be produced in one piece, preferably as a bent and stamped part. In this case, it is contemplated in a particularly advantageous way to shape tensile load absorption mechanism 16 through material section 25, which is stamped out between both curved sections 8, 9 and is configured as a straight stud 26 which carries a hook 18 on its free end 17 which may be produced by a bent section 27 forming an open loop. After material section 25 is, for example, stamped out, the curved sections may be bent toward deformation element 7. Subsequently, hook 18 is bent and hung on the attachment element, preferably through the bending.

Cutout 23 is preferably introduced into one of attachment elements 3 or 4 such that it comes to rest at a slight distance behind neighboring curved section ends 14 or 15, which lie next to one another, to form a support stud 34 which is at least partially enclosed by hook 18. Cutout 23 preferably has a width W, measured transversely to tensile or pressure direction Zr or Dr, respectively, which corresponds to distance A of both curved sections 8, 9. It is clear, therefore, that width B of stud 26 approximately corresponds to width W of cutout 23. It is also contemplated to provide support stud 34 between the two curved sections, preferably in the region of their ends 14, 15. Hook 18 would then be hooked onto end 14 or 15 on the attachment element side on deformation element 7.

The embodiment of a support 101 shown in FIG. 4 has a tensile load absorption feature 116 which has a hook 18 on each of its two ends 117 and 119, each of which is hooked into an eye 22, which is introduced into each attachment element 3 and/or 4. Attachment elements 3, 4 and deformation element 7 are particularly produced in one piece as bent and stamped parts. Tensile load absorpition feature 16, having two hooks 18, may be manufactured from stamped-out material section 25. Hooks 18 are also able to be hooked into the attachment elements by bending. If tensile loads Zk act on the attachment elements, tensile load absorption feature 16 bypasses deformation element 7. If compressive loads Dk act, hooks 18 release respective attachment elements 3 and/or 4, so that deformation element 7 may be deformed.

Figure 5:
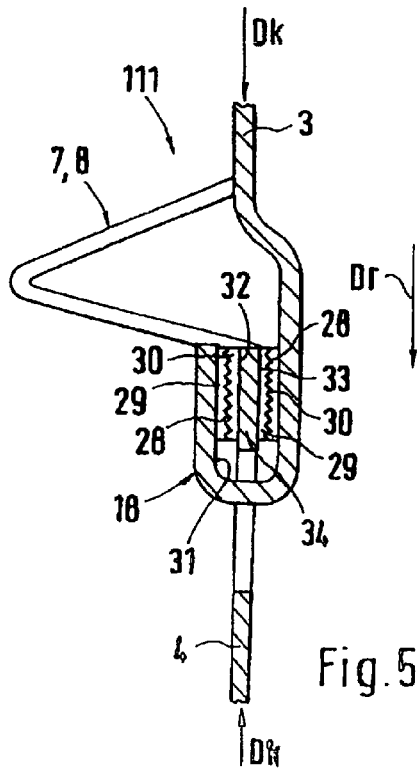
FIG. 5 is a side view of a third embodiment of a support.

In a support 111 illustrated in FIG. 5, it is clear that the release of attachment element 4 by hooks 18 may be influenced by mechanism 28 which elevates the friction between hooks 18 and attachment element 4, so that impact energy may be converted through friction even during this release. Mechanism 28, which elevates the friction, is preferably formed by teeth 29, 30, which engage in one another. At least one tooth 29 is able to be hooked on inner surface 31, and at least one tooth 30 is able to be on top and/or bottom 32, 33, respectively, of attachment element 3 facing the hook inner surface.

A support 121 is illustrated in FIG. 6, in which deformation element 127 is implemented with a U-shaped cross-section, preferably having a level base or bight B1 of the U. Therefore, this deformation element has an intended buckling region 13 between each leg 11 and/or 12 and base B1. As shown in FIG. 6b, the intended buckling regions are, in addition to regions 21, deformed in the event of a compressive load Dk.

In the embodiment of a support 131 shown in FIG. 7a, deformation element 137 is implemented with a curved cross-section, particularly circularly curved. This curve 35 is connected at its curve ends 36 to attachment element 3 and/or 4. Intended buckling region 13 runs essentially over the entire length of the curve here, which, as shown in FIG. 7b, deforms into a shape similar to an Ω under the effect of compressive load Dk.

As shown in FIG. 8, support 1, 101, 111, 121, 131, and 141 is provided for connecting interior lining part 2 to vehicle body 5. Interior lining part 2 is assumed here, purely for explanatory purposes, as cockpit lining part Cv, which may also include an airbag cover or lid 37. An airbag module 38 is attached to vehicle body 5 behind the airbag cover via at least one support clip 39. One of the support clips is attached to vehicle body 5 and/or cockpit crossbeam 6 and the other to airbag module 38. Both support clips 39 are connected to one another via attachment device 40, so that the airbag module is held reliably and firmly on the vehicle body 5.

Each support 141 has, according to a further embodiment, attachment straps 41 on its attachment element 4 on the side of the vehicle body, which may be connected to the cockpit crossbeam, preferably through welding, and which are preferably manufactured in one piece with their assigned attachment element 4. Penetration openings 42 for attachment device 43, which connect each attachment element 3 to interior lining part 2, may be provided on attachment elements 3 on the interior lining part side. Of course, corresponding penetration openings 42 for attachment device 43 may be provided, as shown in FIG. 10, on both attachment elements 3, 4. For the connection on the body side, attachment elements 4 are preferably screwed onto holding clip 39.

It is clear from FIG. 9 that compressive loads Dk, whose lines of action run parallel to pressure direction Dr, pressure direction Dr having at least one active component parallel to and in travel direction Fr, are generated by an impact of an object or a body part on interior lining part 2. Entire interior lining part 2 is therefore displaced in pressure direction Dr through the impact of the body part or the object. For example, displacement occurs substantially parallel to a partially illustrated windshield 44 of the motor vehicle, with impact energy being converted into deformation work through deformation elements 7. Therefore, if the airbag is not triggered, the risk of injury for vehicle occupants is advantageously at least reduced if the interior lining part is displaced from its starting position Pa, indicated by dashes in FIG. 9, to its deformation position Pd, illustrated by solid lines.

If an airbag triggering occurs, as shown in FIG. 10, airbag 45, which has pressure applied to it, impacts on inner side 46 of airbag cover 37, through which an intended breaking point 47, at least partially surrounding airbag cover 37, is broken open. Airbag cover 37 may thus be opened like a flap or blown off so that the airbag may deploy completely into interior space I of the vehicle. Because tensile load absorption feature 16 acts on support 1 in tension direction Zr and bypasses deformation element 7, the deformation element 7 is essentially not deformable in tension direction Zr. Interior lining part 2 is therefore held undisplaceably with its airbag cover 37 in tension direction Zr, so that in the event of an impact of airbag 45 on inner side 46 of airbag cover 37, intended breaking point 47 reliably tears open. Tensile loads Zk, which act in the tension direction on the supports, are therefore generated by deploying airbag 45. Tensile loads Zk therefore have at least one active component which acts against travel direction Fr.

For interior lining part 2 described in connection with FIGS. 8, 9, and 10, it was assumed, purely for exemplary purposes, that it is formed by cockpit lining part Cv, behind which the passenger airbag is positioned. Of course, the support may also support an interior lining part positioned on the inside of the door, for example, particularly if a side airbag is positioned behind the door lining part. In fact, the support may be used for any desired interior lining parts and/or equipment parts of the motor vehicle, particularly for those upon which a body part may impact in the event of a crash of the vehicle. Each interior lining part may be attached to the body of the vehicle using one or more supports.

What is claimed is:

1. A support for an interior lining part of a vehicle; comprising a first attachment element connectable to the interior lining part, a second attachment element connectable to a body of the vehicle, a deformation element that is at least one of elastically and plastically deformable and is arranged to lie between and be connected to the first and second attachment elements, and a tensile load absorber configured and arranged to relieve the deformation element in a tension direction, wherein the tensile load absorber has a hook on at least one end thereof so as to be hookable onto one of the attachment elements or onto an end of the deformation element toward one of the attachment elements and to be unhookable toward the tension direction, and wherein at least one device configured to increase friction is operatively arranged at least one of an inner surface of the hook and on the attachment element in a region enclosed by the hook the friction increasing device being configured as teeth arranged to engage one another, one of which is positioned on the hook inner surface and the other of which is positioned on one of the attachment elements.

2. The support according to claim 1, wherein another end of the tensile load absorber is rigidly connected to the other one of the attachment elements.

3. The support according to claim 1, wherein an eye is arranged at one of the attachment elements such that the hook is hookable thereinto.

4. The support according to claim 3, wherein another end of the tensile load absorber is rigidly connected to the other one of the attachment elements.

5. The support according to claim 3, wherein at least one of the attachment elements is configured as a slab-shaped strip, into which a cutout is formed as the eye.

6. The support according to claim 5, wherein the cutout is arranged slightly behind neighboring curved section ends lying next to one another, through which a cutout support stud lying between the attachment elements and the deformation element is formed and onto which the hook is hookable.

7. The support according to claim 1, wherein the attachment elements are configured as slab-shaped strips, and the deformation element has at least one curved section with curved section ends that are each connected to a respective one of the attachment elements.

8. The support according to claim 7, wherein the curved sections are one of curved, V-shaped and U-shaped.

9. The support according to claim 1, wherein the deformation element has two spaced, substantially parallel curved sections, the support is configured as a one piece, bent-and-stamped part, and the tensile load absorber is constituted by a stamped-out material section between two curved sections.

10. The support according to claim 9, wherein the curved sections are one of curved, V-shaped and U-shaped.

11. The support according to claim 1, wherein the deformation element has two spaced, substantially parallel curved sections, the attachment elements and the deformation element constitute a one-piece, bent-and-stamped part, and the tensile load absorber has two hooks, each of which is hookable into a respective one of the attachment elements.

12. The support according to claim 1, wherein at least one of the attachment elements has a penetration opening for an attachment device.

13. The support according to claim 1, wherein the interior lining part includes an airbag cover for a vehicle passenger airbag.

* * * * *